Patented July 23, 1940

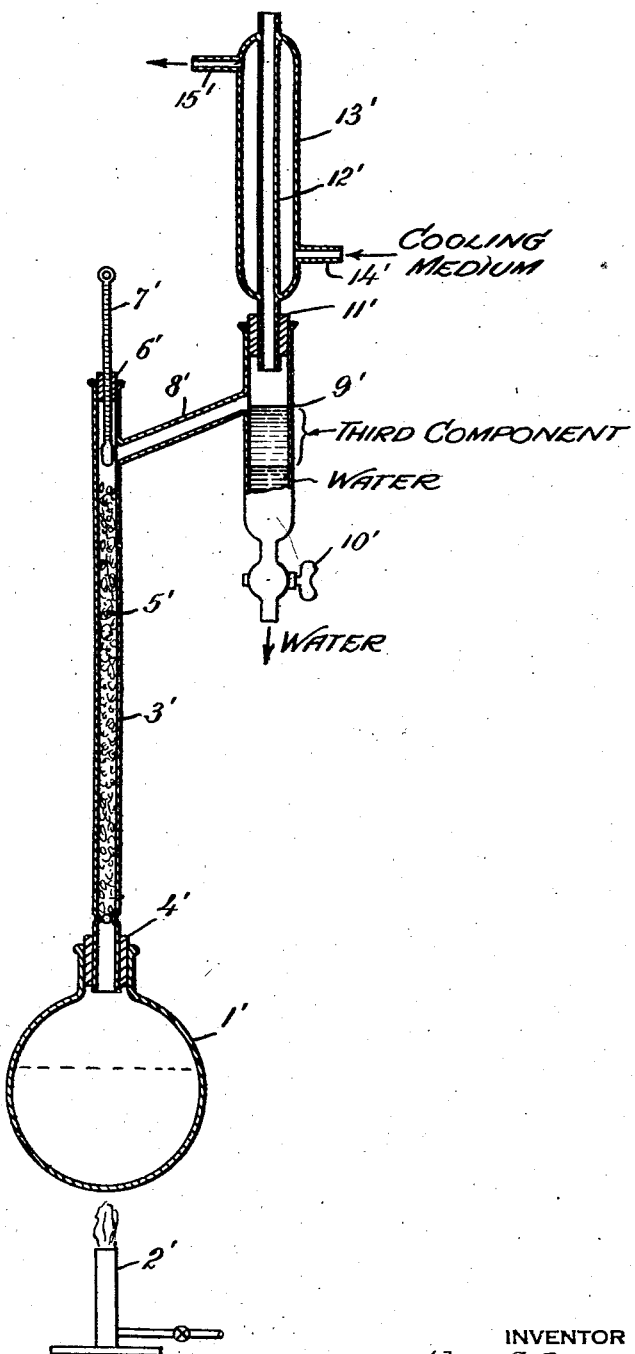

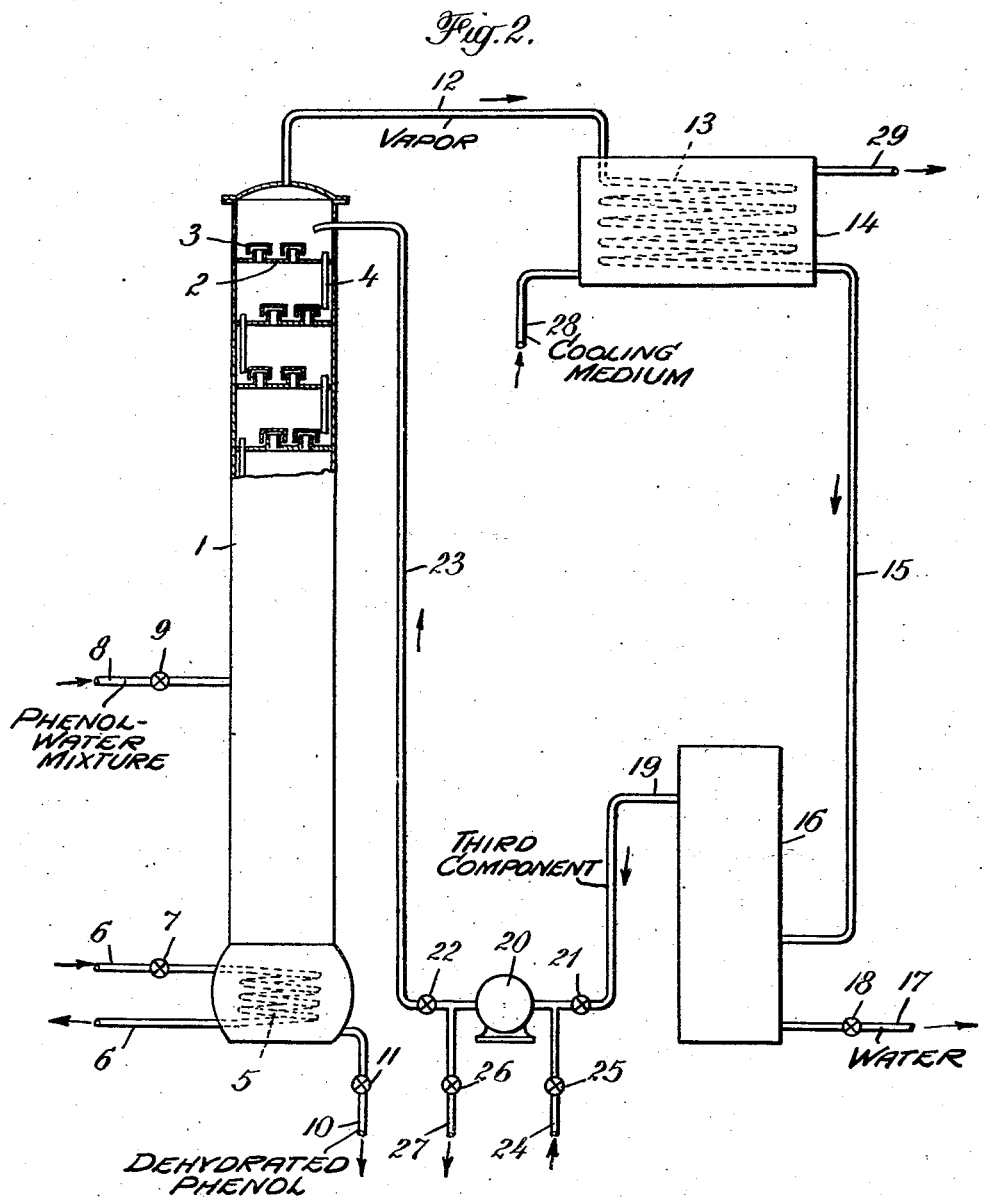

2,209,150

UNITED STATES PATENT OFFICE 2,209,150

PHENOL RECOVERY

Alva C. Byrns, Los Angeles, Calif., assignor to Richfield Oil Corporation, Los Angeles, Calif., a corporation of Delaware Application June 21, 1938, Serial No. 214,948

1 Claim. (Cl. 202—42)

This invention pertains to the production of anhydrous phenol. More specifically, it pertains to a process for the separation of phenol and water from mixtures of these materials in such a manner that each separated component is substantially free of the other.

It is the practice to separate phenol from phenol-water mixtures by fractional distillation, the water being vaporized and the major proportion of the phenol remaining behind in the distillation equipment as a residue. The phenol which is recovered in this manner is practically free of water, but appreciable amounts are carried out of the system with the water in the form of a constant boiling mixture. The condensed constant boiling mixture can be treated with sodium chloride, which causes most of the phenol to separate, but even after this procedure, the water phase holds in solution appreciable quantities of phenol. Various methods for reducing the ultimate loss of phenol have been developed, and recoveries as high as 94 per cent by using a non-volatile absorption medium to strip the vapors of phenol have been reported. However, while probably more efficient than the two step method, consisting of distillation and salting out the phenol which escapes with the water, these methods still allow more or less phenol to be carried off with the water, as the latter is contaminated with about the same amount of phenol as is found after the salting out operation referred to above. Also, it may be necessary or desirable to separate the phenol from the absorption medium, which requires additional equipment.

Small quantities of phenol dissolved in water make disposal of the latter a serious problem. If, for example, water of this sort finds its way into a domestic water supply and is chlorinated, the chlorophenols which are formed impart an objectionable odor and taste. It is also apparent that, while the concentration of phenol in the waste water may appear to be small, the amount lost may be relatively large with respect to the phenol from which the water has been removed. It is desirable, therefore, to reduce the amount of phenol which is discarded with the waste water (1) to minimize polution and other objectionable features involved in disposal of the water, and (2) to effect economies in phenol recovery.

I have discovered that phenol-water mixtures can be separated into phenol substantially free of water and water substantially free of phenol by introducing a suitable third component and subjecting the three component mixture to fractional distillation. The third component can be introduced into the original phenol-water mixture or can be added as reflux in a fractionating column, as will be described later. I have found that a closely fractionated petroleum oil boiling between about 100° C. and 150° C. may advantageously be used as the third component in such an operation. This third component should conform to the following requirements:

1. The third component should carry the water overhead as vapor at a temperature below the minimum boiling point for phenol-water mixtures;
2. The third component—water vapor mixture should have a reasonably high partial pressure of water, in order to avoid excessive heat consumption for vaporizing reflux;
3. The third component should be readily separable from water, best immiscible with water in liquid phase;
4. Phenol should be more soluble in the third component that it is in water;
5. For economic reasons, it should not be expensive.

A closely fractionated petroleum oil boiling between about 100° C. and 150° C. conforms closely to all of the requirements above enumerated.

The successful practice of my invention depends upon the formation of a mixture of the water and the third component, the boiling point of which is lower than that of a minimum boiling mixture of phenol and water. When added as reflux in a fractionating column, the third component strips the phenol-water vapors of the phenol, the phenol being condensed and remaining in the tower or in the still, while the water passes on as vapor, mixed with the vapors of the third component. When mixed with phenol and water and distilled, the third component carries the water off and leaves the phenol in the still as a residue. After condensation of the vapors, the third component can be separated from the water and returned to the distillation or fractionating system as needed.

The method is capable of separating the phenol-water mixture to an extent such that the recovered phenol is substantially anhydrous. It is also possible to obtain a water effluent which contains phenol to the extent of only one-fifth to one-tenth of the concentration which is obtained by older methods.

The process of my invention may be carried out in a still of conventional design equipped with a fractionating column and condensing means. In separating small quantities of phenol and water, a Hempel distillation flask, the column of which is packed with glass beads may be employed. The phenol-water mixture together with the third component above described is placed in the flask and heat applied. The vapors passing thru the fractionating column undergo refluxing, the phenol being condensed and returned to the flask and the mixed vapors of the water and third component passing from the fractionating column into the condenser. These condensed vapors are collected and separate in two layers in the receiver.

In an alternative method of separating phenol and water from mixtures of the two in accordance with the present invention, the third component after separation from the water is advantageously returned as reflux to the fractionating column. Suitable forms of apparatus for carrying out this embodiment of my invention are illustrated diagrammatically in the attached drawings of which Figure 1 represents a laboratory scale assembly, and Figure 2 represents an apparatus suitable to separate phenol and water on a commercial scale.

As shown in Figure 1 of the drawings, still 1' is heated by burner 2'. Fractionating column 3' is connected to still 1' by stopper 4' and is filled with suitable packing 5'. The upper end of fractionating column 3' is closed by stopper 6', through which is inserted thermometer 7'. Vapor outlet 8' connects fractionating column 3' with receiver 9', which is provided with drain cock 10'. Receiver 9' is closed at the top with stopper 11', through which is inserted condenser 12'. Condenser 12' has a water jacket 13', provided with water inlet 14' and water outlet 15'. In carrying out my invention in this form of apparatus, a mixture consisting of phenol, water, and a third component lighter than water is charged into still 1' and heated by burner 2'. The vapors pass upward through fractionating column 3' and through vapor outlet 8' into receiver 9'. The hot vapors are condensed by condenser 12' and collect in receiver 9'. The condensate consists of water and the third component which separate into two layers, the water going to the bottom of receiver 9' and the third component floating as a top layer. After a short period of time, the liquid level in receiver 9' rises to a point where the third component overflows and returns to fractionating column 3' through vapor line 8' to serve as reflux. Water is removed from receiver 9' through the outlet controlled by cock 10' at a rate sufficient to prevent return of water to the column 3' through line 8'. Distillation continues until the water is removed from the charge in still 1', when water ceases to collect in receiver 9'.

Fig. 2 represents another form of apparatus in which the dehydration of phenol can be accomplished in a continuous operation. Column 1 is a conventional fractionating bubble tower provided with trays 2, upon which are arranged nipples covered by bubble caps 3. They are also provided with down-spouts 4. In the lower portion of bubble tower 1 is a heating coil 5, through which is circulated a heating medium conducted to and from it by pipe 6 controlled by valve 7. Pipe 8, controlled by valve 9, is a feed pipe from storage, not shown. Pipe 10, controlled by valve 11 is a discharge pipe for the dehydrated phenol. Vapor line 12 connects the fractionating column to condenser 13, which is submerged in cooling box 14, provided with water inlet 28 and water outlet 29. Condenser 13 is connected by pipe 15 to separator 16. Pipe 17, controlled by valve 18, is a discharge line for separated water. Pipe 19 is the outlet for a lighter than water third component. Pump 20, controlled by valves 21 and 22, returns the separated third component to the top of fractionating column 1 through pipe 23. Pipe 24, controlled by valve 25 is a feed line from storage, not shown, to introduce the third component into the system. Pipe 27, controlled by valve 26 is a discharge line to return excess amounts of the third component to storage, not shown.

In carrying out my invention in the apparatus shown in Fig. 2, the phenol-water mixture is introduced through pipe 8, the rate being controlled by valve 9, into fractionating column 1. The fresh feed travels downward in fractionating column 1, countercurrent to the hot phenol-water vapor mixture generated by coil 5 in the heater section. As the mixed phenol-water vapors rise in the upper portion of column 1, they come into contact with reflux including the third component supplied to the distillation, this third component being introduced into the top of column 1 through pipe 23. When this contact occurs, the third component is vaporized and the phenol is condensed. The vapors, now consisting of water and the third component pass out of column 1 through vapor line 12, while the liquid phenol descends through column 1 and collects in the bottom, from which it is withdrawn through pipe 10, controlled by valve 11, and conveyed to storage, not shown. The vapors are liquefied in condenser 13 and then pass through pipe 15 to separator 16, where the water settles to the bottom and is removed through pipe 17, controlled by valve 18. The third component is removed through pipe 19 by pump 20, controlled by valves 21 and 22, and is returned as needed for reflux through pipe 23 to the top section of column 1, as previously stated.

In order to illustrate results obtainable by using the methods described herein, the following example is presented.

A mixture of 200 c. c. commercial phenol, 1800 c. c. water and 60 c. c. of a petroleum naphtha having an initial boiling point of 99° C. and an end-point of 161° C. was subjected to distillation in apparatus of the form illustrated in Fig. 2. The condensed water was collected and tested for phenol, the results being shown below:

| Sample number | Water removed from receiver | Phenol in removed water | Phenol concentration of removed water |
|---|---|---|---|
| | Cubic centimeters | Grams | Percent |
| 1 | 186.5 | 0.194 | 0.104 |
| 2 | 188.5 | 0.113 | 0.060 |
| 3 | 187.0 | 0.116 | 0.062 |
| 4 | 187.0 | 0.143 | 0.076 |
| 5 | 188.0 | 0.148 | 0.079 |
| 6 | 189.5 | 0.183 | 0.096 |
| 7 | 188.5 | 0.136 | 0.072 |
| 8 | 188.5 | 0.161 | 0.085 |
| 9 | 187.5 | 0.210 | 0.112 |
| 10 | 37.5 | 0.074 | 0.197 |
| 11 | 38.0 | 0.067 | 0.176 |
| 12 | 30.0 | 0.096 | 0.320 |
| 13 | [2] 13.0 | 0.014 | 0.108 |
| Total | [1] 1,809.5 | 1.655 | [3] 0.0889 |

[1] Phenol recovered (by difference), 99.21%.
[2] This recovery indicates moisture in the original charge of phenol.
[3] Average.

While the apparatus described herein is well adapted to carry out the features of my invention, I do not wish to be limited thereby. Any apparatus which is capable of performing to give efficient fractional distillation can be used, and I wish to include any and all such modifications which may fall within the scope of my invention. The process is also adapted to the dehydration of the homologues of phenol, such as the cresols, xylenol, etc., and, while for illustrative purposes, the description has been limited to phenol, I wish to include the phenols broadly and mixtures thereof.

I claim:

In the separation of mixtures of phenol and water into a phenol component substantially free from water and a water component substantially free from phenol, the improvement which comprises distilling the mixture in the presence of a petroleum fraction boiling between about 100° C. and 150° C., said petroleum fraction being supplied to the distillation zone in a quantity sufficient to effect substantially complete distillation of the water, and separately collecting the distilled water-petroleum fraction mixture.

ALVA C. BYRNS.